(12) United States Patent
Oueslati et al.

(10) Patent No.: US 11,453,002 B2
(45) Date of Patent: Sep. 27, 2022

(54) MICROFLUIDIC DEVICE TO DELIVER A CONTROLLED AMOUNT OF LIQUID TO AN ANALYSIS TOOL FOR ANALYSIS

(71) Applicant: WITHINGS, Issy les Moulineaux (FR)

(72) Inventors: Ianis Oueslati, Vanves (FR); Charlotte Leger, Paris (FR); Marine Kirat, Malakoff (FR)

(73) Assignee: WITHINGS, Issy les Moulineaux (FR)

( * ) Notice: Subject to any disclaimer, the term of this patent is extended or adjusted under 35 U.S.C. 154(b) by 169 days.

(21) Appl. No.: 17/121,101

(22) Filed: Dec. 14, 2020

(65) Prior Publication Data

US 2021/0178390 A1 Jun. 17, 2021

(30) Foreign Application Priority Data

Dec. 13, 2019 (EP) ..................................... 19216228

(51) Int. Cl.
*B01L 3/00* (2006.01)
*G01N 35/10* (2006.01)

(52) U.S. Cl.
CPC .... *B01L 3/502715* (2013.01); *G01N 35/1016* (2013.01); *B01L 2200/0605* (2013.01);
(Continued)

(58) Field of Classification Search
CPC ....... B01L 3/502715; B01L 2200/0605; B01L 2300/0627; B01L 2300/161; B01L 2400/0487; B01L 2400/0605; B01L 2200/027; B01L 2300/0645; B01L 2300/0825; B01L 2400/065;
(Continued)

(56) References Cited

U.S. PATENT DOCUMENTS

| 5,308,583 | A | 5/1994 | Sanuki |
| 6,180,061 | B1 | 1/2001 | Bogen et al. |
| 2015/0056110 | A1* | 2/2015 | Hanko ..................... B01L 3/527 422/504 |

FOREIGN PATENT DOCUMENTS

EP  1150105  10/2001

OTHER PUBLICATIONS

European Search Report Application No. EP 19216228.7 dated May 8, 2020.

* cited by examiner

*Primary Examiner* — Jennifer Wecker
*Assistant Examiner* — Oyeleye Alexander Alabi
(74) *Attorney, Agent, or Firm* — Pillsbury Winthrop Shaw Pittman LLP

(57) ABSTRACT

The present disclosure provides a microfluidic device configured to deliver a controlled amount of a liquid to an analysis tool, wherein the microfluidic device comprises:
  a buffer tank configured to contain a liquid and/or a gas;
  at leas one level sensor configured to measure a liquid level in the buffer tank;
  a pneumatic system configured to create selectively a positive or a negative pressure in the buffer tank;
  at least one intake port to let in a liquid in the buffer tank;
  at least one delivery port to inject a controlled amount of liquid from the buffer tank onto the analysis tool;
  at least one drain port with a controlled drain valve, located on the lower part of the buffer tank to discharge the liquid from the buffer tank;
  a first check valve located upstream of the intake port and a second check valve between the buffer tank and the analysis tool.

19 Claims, 4 Drawing Sheets

(52) U.S. Cl.
CPC . *B01L 2300/0627* (2013.01); *B01L 2300/161* (2013.01); *B01L 2400/0487* (2013.01); *B01L 2400/0605* (2013.01)

(58) Field of Classification Search
CPC .............. B01L 3/502738; B01L 3/523; B01L 3/50273; G01N 35/1016; G01N 35/1097; G01N 35/1002; G01N 2035/1025; G01N 2035/1034
See application file for complete search history.

MICROFLUIDIC DEVICE TO DELIVER A CONTROLLED AMOUNT OF LIQUID TO AN ANALYSIS TOOL FOR ANALYSIS

CROSS-REFERENCE TO RELATED APPLICATION

This application claims priority under the Paris Convention to European Patent Application No. 19216228.7 filed on Dec. 13, 2019.

The present disclosure belongs to the field of microfluidic devices. More precisely, the present disclosure refers to a microfluidic device configured to deliver a controlled amount of a liquid to an analysis tool.

BACKGROUND OF THE DISCLOSURE

The development of precision medicine calls for major progress in the development of new tools and methods adapted for detection and analysis of biomolecular materials.

The field of microfluidics offers key advantages for that purpose: microfluidic chips provide control and manipulation of tiny amounts of liquids in sub-millimeter channels and other structures leading to the reduction of the amount of liquid required for low cost analysis, and provide automation capabilities for reliable analysis.

Given the benefits of reduced sample volume, highly predictable liquid dynamics, high resolution and sensitivity, and dimension scalability, microfluidic chips are used in numerous applications.

EP1150105 discloses a microdosing device configured to control a small amount of liquid of the order of microliters or sub-microliters. The quantity of liquid injected into a buffer tank or ejected from a buffer tank can be determined by measuring the pressure in the buffer tank.

The disclosed microdosing device is not adapted for use in combination with analysis tools such as a microfluidic chip, for example, which would be necessary for detection and analysis of biomolecular materials. Furthermore, filling or purging of the buffer tank of the microdosing device with a liquid is complicated.

Accordingly, a need exists for a compact microfluidic device that alleviates the above-mentioned problems.

SUMMARY OF THE DISCLOSURE

The present disclosure provides a microfluidic device configured to deliver a controlled amount of a liquid to an analysis tool, wherein the microfluidic device comprises:
- a buffer tank configured to contain a liquid and/or a gas;
- at least one level sensor configured to measure a liquid level in the buffer tank;
- a pneumatic system configured to create selectively a positive or a negative pressure in the buffer tank;
- at least one intake port to let a liquid in the buffer tank;
- at least one delivery port to inject a controlled amount of liquid from the buffer tank onto the analysis tool;
- at least one drain port with a controlled drain valve, located on the lower part of the buffer tank to discharge the liquid from the buffer tank;
- a first check valve located upstream of the intake port and a second check valve between the buffer tank and the analysis tool.

This microfluidic device allows to precisely control an amount of liquid, such as a biomolecular material, and to analyze the liquid on the analysis tool.

The pneumatic system controls the injection of liquid into the buffer tank and the injection from the buffer tank onto the analysis tool, wherein the amount of liquid in the buffer tank is controlled by the level sensor.

The use of the first check valve ensures that liquid does not flow back out of the buffer tank through the intake port. The use of the second check valve ensures that liquid does not flow from the analysis tool back into the buffer tank.

In one embodiment, the analysis tool is a microfluidic chip.

A microfluidic chip comprises a set of micro-channels etched or molded into a material and integrates at least one "laboratory" analysis function, such as chemical analysis. It allows for precise analysis of a biomolecular material.

In one embodiment, the analysis tool comprises at least one test strip.

A test strip is a band/piece/strip of any material used for fast and low-cost analysis of a biomolecular material.

In one embodiment, the pneumatic system comprises at least one pump.

The at least one pump allows controlling and/or regulating the pressure in the buffer tank.

In one embodiment, the pneumatic system comprises two pumps.

One pump is configured to generate a positive pressure in the buffer tank and the other pump is configured to create a negative pressure in the buffer tank.

In one embodiment, the pneumatic system comprises a single pump and four valves.

A positive/negative pressure can be generated in the buffer tank in dependence on which of the valves are open/closed.

In one embodiment, the at least one pump is an air pump.

For creating a positive pressure the at least one pump injects air into the buffer tank.

For creating a negative pressure the at least one pump evacuates air from the buffer tank.

Using an air pump is advantageous since an air pump is significantly cheaper than a liquid pump.

In one embodiment, the inner walls of the buffer tank are hydrophobic.

The use of hydrophobic inner walls minimizes adhesion of the liquid to the inner walls and hence minimizes the risk of contamination between two subsequent analyses, thus improving the reliability and accuracy of each analysis.

In one embodiment, the buffer tank has a diameter which increases from the lower part of the buffer tank to the upper part of the buffer tank.

This particular shape reduces the risk of liquid being trapped at the lower part of the buffer tank, thus avoiding contamination between two subsequent analyses and improving the reliability and accuracy of each analysis.

In one embodiment, the buffer tank has a volume in a range from 0.1 mL to 10 mL.

This allows storing a sufficient amount of liquid necessary for analysis on the analysis tool. It further allows for precise control of the amount of liquid injected onto the analysis tool.

In one embodiment, the intake port is configured to supply a liquid to the buffer tank from a funnel which is located upstream of the first check valve.

The funnel facilitates injection of a liquid into the buffer tank through the intake port.

In one embodiment, the level sensor configured to measure the liquid level comprises at least two electrical contacts at the inner side of the buffer tank.

An establishment of an electrical conduction between at least two electrical contacts indicates the liquid level and hence the amount of liquid in the buffer tank.

In one embodiment, the microfluidic device comprises a pressure sensor configured to measure a pressure prevailing in the buffer tank.

Precise pressure measurements allow controlling and determining the amount of liquid injected into the buffer tank and from the buffer tank onto the analysis tool.

In one embodiment, the buffer tank comprises a calibrated leak.

The calibrated leak allows for a controlled leakage which avoids an overpressure inside the buffer tank.

The calibrated leak also allows establishing the optimum pressure range for the pneumatic system aiming at optimizing its performance, in particular when a pump is used. This is a cost effective solution allowing the use of a low-cost pump, although the system exhibits a high accuracy.

In one embodiment, the buffer tank comprises a pneumatic port.

This enables a high precision of regulation of the pressure in the buffer tank.

In one embodiment, the microfluidic device comprises a control unit configured to acquire data from the pressure sensor and from the level sensor, and configured to control at least the pneumatic system and the drain valve.

The control unit controls the operation of the microfluidic device.

Another aspect of the disclosure comprises a method to analyze a controlled amount of liquid on an analysis tool, wherein the method comprises:
- generating, by a pneumatic system, a negative pressure in a buffer tank thereby letting in a liquid into the buffer tank through a first check valve,
- generating, by the pneumatic system, a positive pressure in the buffer tank thereby injecting a controlled amount of liquid from the buffer tank onto the analysis tool, through a second check valve,
- analyzing the controlled amount of liquid on the analysis tool and processing the obtained data;
- controlling a drain valve to discharge a remaining liquid from the buffer tank after injection of the liquid onto the analysis tool.

This method allows operation of the microfluidic device.

In one embodiment, a pressure in the buffer tank is measured repeatedly by a pressure sensor, and the negative and/or positive pressures are controlled as a function of the data provided by the pressure sensor.

This feedback loop ensures accurate operation and precise control of the amount of liquid injected into and discharged from the buffer tank.

In one embodiment, a liquid level in the buffer tank is measured repeatedly by a level sensor, and the phase of generating a negative pressure in the buffer tank is stopped according to a predetermined level condition.

When stopping the phase of generating a negative pressure in the buffer tank, the injection of liquid into the buffer tank ceases.

In one embodiment, the pneumatic system comprises a single pump and four valves, wherein the phase of generating a negative pressure is obtained by running the pump and controlling first and second valves at closed state and controlling third and fourth valves at open state, wherein the phase of generating a positive pressure is obtained by running the pump and controlling third and fourth valves at closed state and controlling first and second valves at open state.

This allows creating a precisely controlled positive/negative pressure in the buffer tank on demand.

BRIEF DESCRIPTION OF THE DRAWINGS

The accompanying drawings, which are incorporated herein and form part of the specification, illustrate the present disclosure and, together with the description, further serve to explain the disclosure and to enable a person skilled in the pertinent art to make and use the disclosure. In the drawings, like reference characters indicate identical or functionally similar elements.

DESCRIPTION OF PREFERRED EMBODIMENTS

Figure 1:
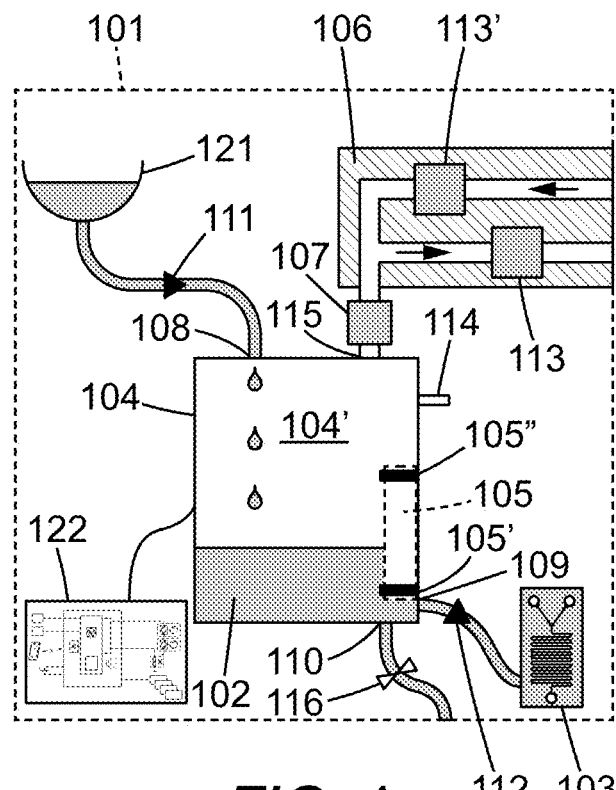
FIGS. 1-2 are schematic views of two embodiments of the microfluidic device in a two-dimensional representation.
Figure 2:
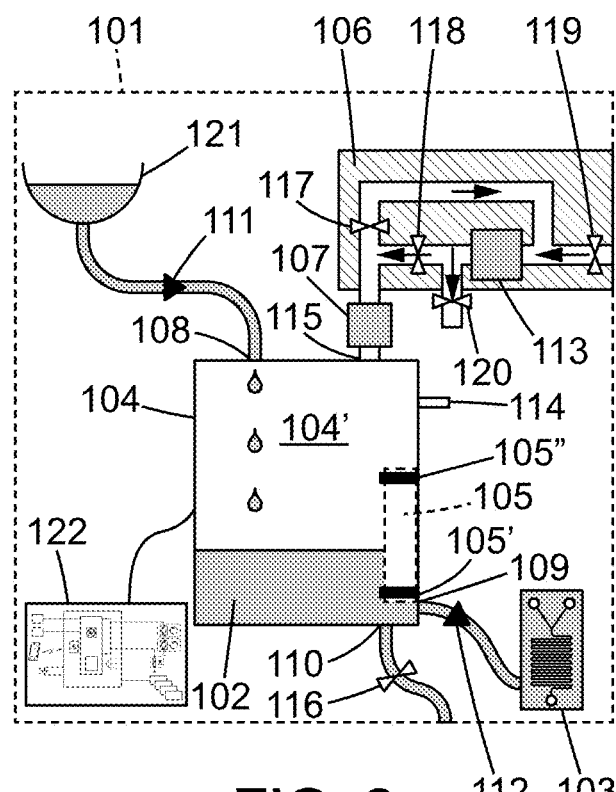

FIGS. 1-2 are schematic views of two embodiments of a microfluidic device 101.

The microfluidic device 101 comprises a buffer tank 104 with an inner volume 104' configured to store a liquid 102 which can be injected into the buffer tank via an intake port 108. The injection is facilitated by a funnel 121 located upstream of the intake port 108. A level sensor 105 inside the buffer tank allows determining the amount of liquid in the buffer tank.

The liquid may be an aqueous solution, for example a body fluid such as urine. It is not excluded though to process other body fluid like blood, lymph, sweat, saliva, plasma.

A pneumatic system 106 is configured to create a negative pressure in the buffer tank 104 which then absorbs the liquid 102 through the intake port 108. In a next step, a positive pressure can be created by the same pneumatic system 106 which allows injecting the liquid 102 from the buffer tank 104 onto an analysis tool 103 via a delivery port 109.

The analysis tool 103 may be in the form of a microfluidic chip.

In one variant, the analysis tool 103 may be a system that comprises at least one test strip, for example a lateral flow immunochromatographic assay or a conventional color test strip. It may further comprise at least one reagent on which a precise quantity of liquid may be deposited or which soaks a precise quantity of liquid. Analysis may be made by using optical analysis methods, for example by using at least one light-emitting diode (LED) for illuminating the test strip, and/or at least one photodiode, and/or at least one charge-coupled device (CCD) and/or at least one complementary metal oxide semi-conductor (CMOS), for detecting a color change of the test strip.

FIG. 1 shows a first embodiment of the pneumatic system comprising two pumps 113, 113'. FIG. 2 shows a second embodiment of the pneumatic system comprising a single pump 113 and four valves 117, 118, 119, 120.

The microfluidic device further comprises a pneumatic port 115 which establishes a fluid connection between the buffer tank and the pneumatic system. The pneumatic port 115 allows regulating the pressure in the buffer tank with high precision.

A pressure sensor 107 can be installed in the buffer tank, or in/at a tube connected to the buffer tank or at the pneumatic port, wherein the pressure sensor is configured to determine the pressure prevailing inside the buffer tank 104.

Alternatively, the pressure in the buffer tank can be deduced from the pump's/pumps' activity.

The pressure in the buffer tank can be measured repeatedly by the pressure sensor, and the negative and/or positive pressures may be controlled as a function of the data provided by the pressure sensor. This feedback loop ensures accurate operation and precise control of the amount of liquid injected into and discharged from the buffer tank.

A first check valve 111 is installed between the funnel and the intake port 108. The first check valve 111 is configured to let the liquid 102 enter the buffer tank 104, but blocks liquid in the opposite direction. A second check 112 valve is installed between the delivery port 109 and the analysis tool 103. It is configured to inject liquid 102 from the buffer tank 104 onto the analysis tool 103, but blocks a flow of liquid in the opposite direction.

A drain port 110 allows discharging the liquid 102 from the buffer tank 104. The discharge of the liquid is controlled by a drain valve 116 that is located downstream of the drain port 110 and can be opened on demand.

In addition, the microfluidic device comprises a calibrated leak 114 which enables a controlled leakage of air which avoids an overpressure inside the buffer tank. The calibrated leak also allows establishing the optimum pressure range for the pneumatic system aiming at optimizing its performance.

The microfluidic device further comprises or is connected to a control unit 122, which is configured to control at least a part of the active components of the microfluidic device, such as the two pumps 113, 113' in the first embodiment (FIG. 1) or, in the second embodiment, the single pump 113 and the four valves 117, 118, 119, 120.

The control unit may control the pneumatic system to create a positive pressure in the buffer tank in order to discharge the liquid from the buffer tank.

Alternatively, the liquid may be discharged from the buffer tank by using gravity and without creating any additional positive pressure in the buffer tank.

The control unit further controls the drain valve 116 and the analysis tool 103.

In addition, the control unit may control and/or acquire data from the pressure sensor 107 and/or the level sensor 105 and/or the pneumatic port 115.

In one variant, the level sensor 105 is made from two electrical contacts 105', 105" located at different positions between the lower part and the upper part of the buffer tank 104. In dependence on the level of the liquid 102 in the buffer tank 104 an electrical conducting connection is created between the electrical contacts 105, 105" and an electrical current flows through the liquid which can be detected.

Alternatively, the level sensor comprises more than two electrical contacts. It is thus contemplated to adapt the number of electrodes (electrical contacts) to reach the targeted accuracy.

The present disclosure is not limited to the use of electrical contacts for measuring the amount of liquid in the buffer tank. Other types of level sensors can be employed as well, such as mechanical, magnetic, optical, ultrasound or pneumatic level sensors.

As mentioned above, FIGS. 1 and 2 differ by the implementation of the pneumatic system 106.

In a first embodiment (FIG. 1), the pneumatic system comprises two unidirectional pumps 113, 113'. A unidirectional pump is configured to create a differential pressure, meaning that the pressure on one side of the pump is higher than the pressure on the opposite side of the pump.

A first unidirectional pump 113 is configured to create a positive pressure in the buffer tank 104 by injecting air into the buffer tank. A second unidirectional pump 113' is configured to create a negative pressure by evacuating air from the buffer tank 104.

In a second embodiment (FIG. 2), a system of one single unidirectional pump 113 and four valves 117, 118, 119, 120, which can be solenoid valves, is used.

When a first valve 118 and a second valve 119 are at an open state and a third valve 117 and a fourth valve 120 at a closed state, the pneumatic system 106 injects air into the buffer tank 104 when the unidirectional pump displaces air towards the buffer tank, hence generating a positive pressure.

When a first valve 118 and a second valve 119 are at a closed state and a third valve 117 and a fourth valve 120 at an open state, the pneumatic system 106 evacuates air from the buffer tank in this configuration.

The system is not limited to the two described embodiments of the pneumatic system or to the use of unidirectional pumps. As an alternative, one single bidirectional pump which is configured to displace air in two directions can be used.

The at least one pump of the pneumatic system can be a membrane pump, a piezoelectric pump, or a mechanical pump, for example.

The check valves 111 and 112 may be passive check valves.

The drain valve 116 may be a solenoid valve.

At least a part of the inner walls may consist of a hydrophobic material, such as polytetrafluoroethylene (PTFE, also known as Teflon™) or polypropylene (PP). By hydrophobic materials are meant materials to which the used liquid does not or almost not adhere. The expected behavior is that adhesion of the used liquid to the inner walls is minimized and purging of the buffer tank after use is facilitated.

The hydrophobic inner walls therefore reduce the risk of contamination between two subsequent analyses, thus improving the reliability and accuracy of the analysis. This feature is advantageous mainly when an aqueous solution is used.

Figure 3:
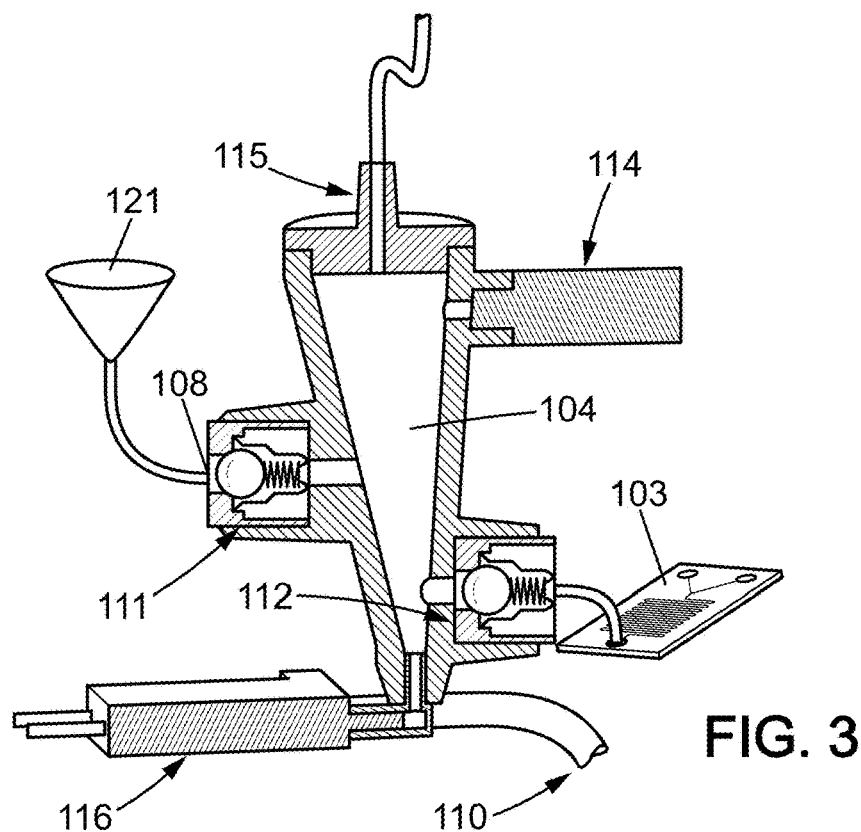
FIGS. 3-4 are two different views of one embodiment of the microfluidic device in a three-dimensional representation.
Figure 4:
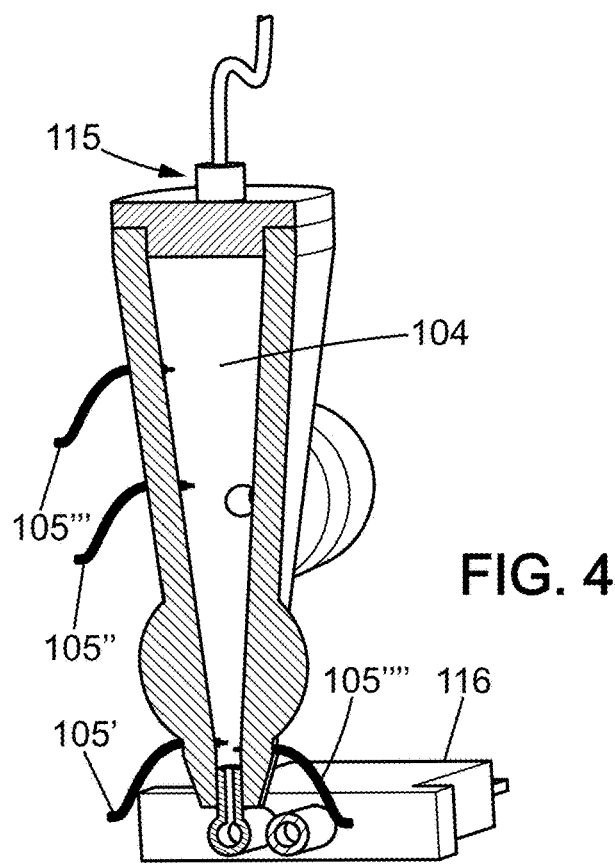

FIGS. 3-4 show two different views of one embodiment of the microfluidic device 101 in a three-dimensional view. The goal is to highlight several components of the buffer tank and to stress the importance of the individual components.

The microfluidic device comprises a buffer tank 104 which has a conical shape and a diameter that increases from the lower part towards the upper part of the buffer tank.

This particular shape reduces the risk of liquid being trapped at the lower part of the buffer tank, thus avoiding contamination between two subsequent analyses and improving the reliability and accuracy of each analysis. It further facilitates the injection of liquid onto the microfluidic chip and the discharge of liquid from the buffer tank.

The upper part of the buffer tank may have constant diameter, i.e. have a cylindrical shape.

The microfluidic device further comprises two check valves as shown in FIG. 3. A first check valve 111 is installed between the funnel and the intake port 108 and a second check 112 valve between the delivery port 109 and the microfluidic chip.

The check valves 111, 112 may be implemented as ball check valves. A ball check valve has two openings, one for liquid enter and one for liquid leave, and a movable closing member in the form of a spring-loaded ball which is configured to block the flow of liquid. The ball is elastically biased to a rest position where the ball rests hermetically on a valve seat.

The ball is most often made of metal, but other materials can be used as well. When considering the check valve 111, a liquid being injected into the buffer tank lifts the ball from its support and liquid can flow through the check valve. However, a liquid flowing in the opposite direction pushes the ball on its seat hence prohibiting transmission of liquid.

Other kinds of check valves may be used, such as diaphragm check valves or swing check valves, for example.

In one variant, the first and second check valves 111, 112 are arranged at the outer wall of the buffer tank 104.

The microfluidic device further comprises a level sensor configured to measure the amount of liquid in the buffer tank. In this embodiment, the level sensor comprises three electrical contacts 105', 105" and 105'" and a ground reference point 105"".

The size of the microfluidic device is of the orders of few centimeters.

The inner volume of the buffer tank is preferably comprised between 0.1 milliliters and 10 milliliters and is larger than the volume of liquid needed for the measurement. The inner volume of the buffer tank can be 100 times to 1 million times the controlled volume to be delivered at the microfluidic chip.

The drain port 110 is preferably placed at the bottom of the tank.

The delivery port 109 is placed at a lower level than the intake port 108.

Figure 5:
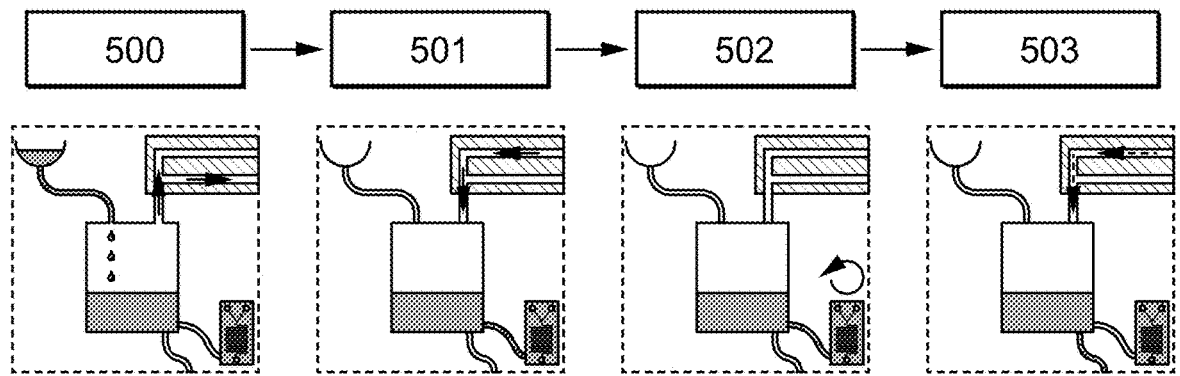
FIG. 5 shows a flowchart of a method describing the operation of the microfluidic device.

FIG. 5 shows a flow chart of the method to operate a microfluidic device 101.

Figure 6:
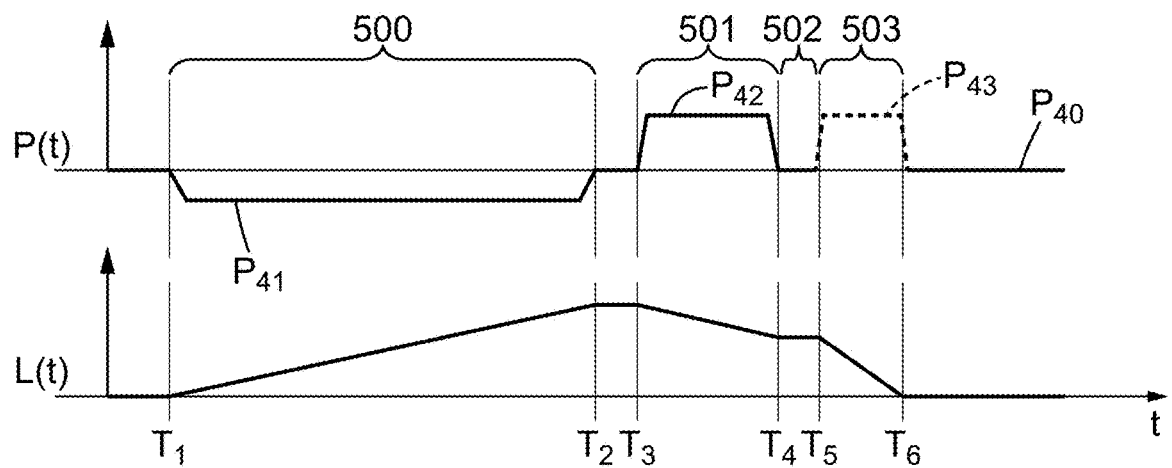
FIG. 6 is an example of time-chart illustrating various steps of the promoted method.

FIG. 6 shows an example time-chart illustrating various steps of the promoted method.

When the microfluidic device 101 is not in use, the inner volume of the buffer tank 104' is at atmospheric pressure of $P(t)=P_{40}$, which is ensured by a calibrated leak 114, and the buffer tank is empty.

Pressures are indicated with respect to atmospheric pressure $P(t)=P_{40}$. Thus, positive pressure refers to pressure higher than atmospheric pressure and negative pressure refers to pressure lower than atmospheric pressure.

A liquid 102 to be analyzed is filled in the funnel 121 of the microfluidic device.

In a first step 500, a pneumatic system 106 generates a negative pressure in a buffer tank 104 of the microfluidic device thereby letting a liquid 102 in the buffer tank through a first check valve 111.

The generation of the negative pressure starts at instant $t=T_1$, and the level sensor measures the liquid level $L(t)$ in the buffer tank repeatedly during step 500. The minimum pressure in the buffer tank attained during step 500 is $P(t)=P_{41}$.

At instant $t=T_2$, the pressure generation ceases. This may be due to a predetermined condition related to the required amount of liquid in the buffer tank.

The buffer tank is now at least partially filled with liquid.

In a second step 501, the pneumatic system 106 generates a positive pressure in the buffer tank 104, thereby injecting a controlled amount of liquid 102 from the buffer tank onto the analysis tool 103, through a second check valve 112. The generation of the positive pressure starts at instant $t=T_3$ and ceases at instant $t=T_4$.

The liquid level is measured repeatedly by a level sensor 105 during step 501 in order to control the amount of liquid injected on the analysis tool. The maximum pressure in the buffer tank attained in step 501 is $P(t)=P_{42}$.

The liquid injected on the analysis tool may only be a small portion of the liquid stored in the buffer tank. Therefore, the time during which the positive pressure is created in step 501 ($T_4-T_3$) may be shorter than the time during which a negative pressure is created in step 500 ($T_2-T_1$). Similarly, the pressure difference ($P_{42}-P_{40}$) may be different from ($P_{40}-P_{41}$).

In a third step 502, the controlled amount of liquid 102 is analyzed on the analysis tool 103 and the obtained data are processed.

Steps 501 and 502 may overlap, meaning that analysis can be made by the analysis tool during injection of liquid onto the analysis tool, i.e. before the process of injection ends.

For the case shown in FIG. 6, the analysis of the liquid on the analysis tool starts at instant $t=T_4$ and ceases at instant $t=T_5$.

In a fourth step 503, a drain valve 116 is controlled to discharge a remaining liquid 102 from the buffer tank 104. Therefore, at instant $t=T_5$, the pneumatic system starts generating a positive pressure in the buffer tank and the drain valve is opened.

The maximum pressure attained during step 503 is $P(t)=P_{43}$.

At instant $t=T_5$, after discharge of the liquid from the buffer tank, the generation of the positive pressure by the pneumatic system ceases and the drain valve is closed.

Alternatively, the analysis (third step 502) may begin at any instant $t>T_4$ after injection of the liquid onto the analysis tool and cease after the time required for analysis. The fourth step 503 may hence be temporally decoupled from the third step 502.

As another alternative, the liquid may be evacuated from the buffer tank by gravity and without generating a positive pressure.

During the described process, the pressure and the liquid level can be measured at any instant by a pressure sensor 107 and the level sensor 105, respectively.

After operation of the microfluidic device, the buffer tank may be purged by the use of a rinsing liquid.

At a time $t>T_5$, the microfluidic device is ready to process another liquid sample.

For the case of urine, typical values for the pressure differences are of the order of ($P_{42}-P_{40}$)=100 mbar for the positive pressure and ($P_{40}-P_{41}$)=50 mbar for the negative pressure, respectively.

Typical values for the time intervals shown in FIG. 6 are: $[T_1,T_2] \leq 30$ s; $[T_2,T_3]=3$ s; $[T_3,T_4]=10$ s; $[T_4,T_5]=3$ s; and $[T_5,T_6]=5$ s.

When other body fluids are used, the mentioned time intervals and pressure differences may be adapted.

A person skilled in the art would know how to adapt the time intervals and pressure values in dependence on the properties of the liquid, such as its viscosity.

Figure 7:
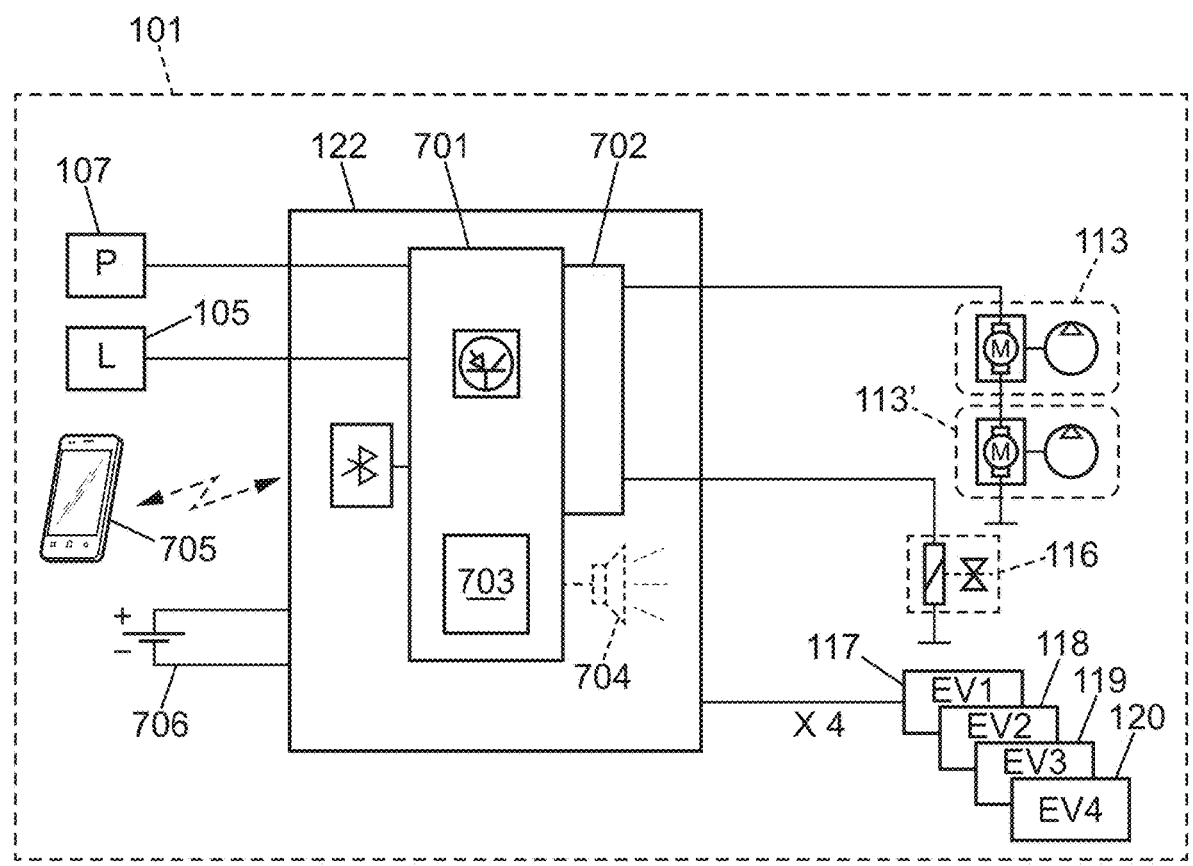
FIG. 7 is a schematic view of a control unit adapted to implement a method to operate the microfluidic device.

FIG. 7 shows the control unit 122 which can be a part of the microfluidic device 101 or be connected to it.

The control unit is configured to implement the method described in FIGS. 5-6 with the microfluidic device shown in FIGS. 1-4.

The control unit 122 may comprise a memory 703 for storing instructions for implementation of at least part of the method, the data received, and temporary data for performing the various steps and operations of the method.

The control unit 122 further comprises a control circuit 701. This control circuit can be, for example: a processor 702 capable of interpreting instructions in the form of a computer program, or an electronic card whose steps and operations of the method of disclosure are described in silicon, or a programmable electronic chip such as an FPGA for "Field-Programmable Gate Array", as a SOC for "System On Chip" or as an ASIC for "Application Specific Integrated Circuit".

SOCs or systems-on-chips are embedded systems that integrate all the components of an electronic system into a single chip. An ASIC is a dedicated electronic circuit that brings together custom features for a given application. ASICs are generally configured during their manufacture for performing a dedicated. The programmable logic circuits of the FPGA type are reconfigurable electronic circuits by the user of the device.

The device comprises an input interface for receiving messages or instructions, and an output interface for communication with the electronic entities of the system which implements the method according to the present disclosure.

Depending on the embodiment, the control unit 122 may be a computer, a computer network, an electronic component, or another device comprising a processor 702 operatively coupled to a memory 703, and, depending on the mode of operation, selected embodiment, a data storage unit, and other associated hardware elements such as a network interface and a media reader for reading a removable storage medium and writing on such a medium not shown in the figure. The removable storage medium may be, for example, a flash disk, a USB stick, etc.

According to the embodiment, the memory 703, the data storage unit or the removable storage medium contains instructions which, when executed by the control circuit 701, cause this control circuit 701 to performing or controlling the input interfaces, output interface, data storage in the memory 703 and/or data processing and method implementation examples described herein.

In addition, the instructions can be implemented in software form, in which case it takes the form of a program executable by a processor 702, or in hardware form, or "hardware", as an integrated circuit specific application ASIC, a SOC on a microchip, or in the form of a combination of hardware and software elements, for example a software program intended to be loaded and executed on an electronic component described above such as FPGA processor.

The control unit 122 can also use hybrid architectures, for example architectures based on a CPU+FPGA, or an MPPA for "Multi-Purpose Processor Array".

The control unit may further comprise a beeper device 704. This beeper device can be used to give an audio feedback to the user of the microfluidic device.

The control circuit 701 may be a component which is configured to implement control of at least parts of the microfluidic device 101.

The control circuit may control the pneumatic system 106, especially, depending on the specific embodiment, the pumps 113 and 113' (FIG. 1) or the pump 113 and the four solenoid valves 117, 118, 119, 120 which are configured to control the opening/closing of the respective valves.

For this purpose, the control unit 122 may comprise a hardware power stage 702 in the case the control circuit 701 has not suitable outputs to control directly the power components like the pump and the coils of the solenoid valves.

The control circuit 701 may further be configured to receive data from the pressure sensor 107. The pressure delivered by the pressure sensor is used to control in the closed loop manner the one or more pump(s) as already mentioned.

The control circuit 701 may further be configured to receive data from the level sensor 105.

The control circuit 701 is further configured to control the drain valve 116.

The control circuit 701 may further be configured to control the analysis tool 103.

The microfluidic device may comprise its own electrical power supply 706 in order to be energy-wise autonomous. We note here that an off-the-shelf battery can be used, which is a cost-effective solution.

The microfluidic device may further be wirelessly coupled to one or more external devices 705 in order to receive signals, for example a start signal, and/or remotely send results of analysis with the microfluidic device. The external devices can be a smartphone or a tablet or remote server, without excluding interfacing directly a telemedicine in a remote server.

In addition, the control circuit 701 may be configured to carry out chemical analysis of a biomolecular material with the analysis tool 103. In one possible embodiment, the control circuit 701 only triggers the chemical analysis. In one possible embodiment, the control circuit 701 handles the results of the chemical analysis.

The invention claimed is:

1. A microfluidic device configured to deliver a controlled amount of a liquid to an analysis tool, wherein the microfluidic device comprises:
    a buffer tank configured to contain at least one of a liquid and a gas;
    at least one level sensor configured to measure a liquid level in the buffer tank;
    a pneumatic system configured to create selectively a positive or a negative pressure in the buffer tank;
    at least one intake port to let a liquid in the buffer tank;
    at least one delivery port to inject a controlled amount of liquid from the buffer tank onto the analysis tool;
    at least one drain port with a controlled drain valve, located on the lower part of the buffer tank to discharge the liquid from the buffer tank;
    a first check valve located upstream of the intake port and a second check valve between the buffer tank and the analysis tool.

2. The microfluidic device according to claim 1, wherein the analysis tool is a microfluidic chip or comprises at least one test strip.

3. The microfluidic device according to claim 1, wherein the pneumatic system comprises two air pumps.

4. The microfluidic device according to claim 1, wherein the pneumatic system comprises a single air pump and four valves.

5. The microfluidic device according to claim 1, wherein the inner walls of the buffer tank are hydrophobic.

6. The microfluidic device according to claim 1, wherein the buffer tank has a diameter which increases from the lower part of the buffer tank to the upper part of the buffer tank.

7. The microfluidic device according to claim 1, wherein the buffer tank has a volume in a range from 0.1 mL to 10 mL.

8. The microfluidic device according to claim 1, wherein the level sensor configured to measure the liquid level comprises at least two electrical contacts at the inner side of the buffer tank.

9. The microfluidic device according to claim 1, wherein the microfluidic device comprises a pressure sensor configured to measure a pressure prevailing in the buffer tank.

10. The microfluidic device according to claim 1, wherein the buffer tank comprises a calibrated leak.

11. The microfluidic device according to claim 1, wherein the microfluidic device comprises a control unit configured to acquire data from the pressure sensor and from the level sensor, and configured to control at least the pneumatic system and the drain valve.

12. A method to analyze a controlled amount of liquid on an analysis tool, wherein the method comprises:
generating, by a pneumatic system, a negative pressure in a buffer tank thereby letting in a liquid into the buffer tank through a first check valve,
generating, by the pneumatic system, a positive pressure in the buffer tank thereby injecting a controlled amount of liquid from the buffer tank onto the analysis tool, through a second check valve,
analyzing the controlled amount of liquid on the analysis tool and processing the obtained data;
controlling a drain valve to discharge a remaining liquid from the buffer tank after injection of the liquid onto the analysis tool.

13. The method according to claim 12, wherein a pressure in the buffer tank is measured repeatedly by a pressure sensor, and at least one of the negative and/of positive pressures are controlled as a function of the data provided by the pressure sensor.

14. The method according to claim 12, wherein a liquid level in the buffer tank is measured repeatedly by a level sensor, and the phase of generating a negative pressure in the buffer tank is stopped according to a predetermined level condition.

15. The method according to claim 12, wherein the pneumatic system comprises a single pump and four valves,
wherein the phase of generating a negative pressure is obtained by running the pump and controlling first and second valves at close state and controlling third and fourth valves at open state,
wherein the phase of generating a positive pressure is obtained by running the pump and controlling third and fourth valves at close state and controlling first and second valves at open state.

16. A microfluidic device configured to deliver a controlled amount of a liquid to an analysis tool, wherein the microfluidic device comprises:
a buffer tank configured to contain at least one of a liquid and a gas;
a pneumatic system configured to create selectively a positive or a negative pressure in the buffer tank;
at least one intake port to let a liquid in the buffer tank;
at least one delivery port to inject a controlled amount of liquid from the buffer tank onto the analysis tool;
at least one drain port with a controlled drain valve, located on the lower part of the buffer tank to discharge the liquid from the buffer tank;
a check valve between the buffer tank and the analysis tool.

17. The microfluidic device of claim 16, further comprising a check valve located upstream of the intake port.

18. A microfluidic device assembly comprising a microfluidic device according to claim 16 and an analysis tool, wherein the analysis tool is a microfluidic chip.

19. A microfluidic device assembly comprising a microfluidic device according to claim 16 and an analysis tool, wherein the analysis tool comprises at least one test strip.

* * * * *

UNITED STATES PATENT AND TRADEMARK OFFICE
CERTIFICATE OF CORRECTION

| | |
|---|---|
| PATENT NO. | : 11,453,002 B2 |
| APPLICATION NO. | : 17/121101 |
| DATED | : September 27, 2022 |
| INVENTOR(S) | : Ianis Oueslati et al. |

It is certified that error appears in the above-identified patent and that said Letters Patent is hereby corrected as shown below:

In the Claims

Claim 13 should read:
13. The method according to claim 12, wherein a pressure in the buffer tank is measured repeatedly by a pressure sensor, and at least one of the negative and positive pressures are controlled as a function of the data provided by the pressure sensor.

Signed and Sealed this
First Day of November, 2022

Katherine Kelly Vidal
*Director of the United States Patent and Trademark Office*